US011219101B2

(12) United States Patent
Nam et al.

(10) Patent No.: US 11,219,101 B2
(45) Date of Patent: Jan. 4, 2022

(54) INDUCTION COOKING APPLIANCE HAVING MULTIPLE HEATING COILS (71) Applicant: Haier US Appliance Solutions, Inc., Wilmington, DE (US)

(72) Inventors: Isaac Nam, Louisville, KY (US); William Hull Bicknell, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 483 days.

(21) Appl. No.: 15/969,852

(22) Filed: May 3, 2018

(65) Prior Publication Data

US 2019/0342953 A1    Nov. 7, 2019

(51) Int. Cl.
H05B 6/12    (2006.01)
H05B 6/36    (2006.01)
H05B 6/44    (2006.01)

(52) U.S. Cl.
CPC .......... H05B 6/1272 (2013.01); H05B 6/365 (2013.01); H05B 6/44 (2013.01)

(58) Field of Classification Search
CPC ........ H05B 6/1272; H05B 6/44; H05B 6/365; H05B 6/1254; Y02B 40/00
See application file for complete search history.

(56) References Cited

U.S. PATENT DOCUMENTS

| | | | | |
|---|---|---|---|---|
| 3,704,357 A | * | 11/1972 | Moulin | B23K 1/002 219/675 |
| 4,292,489 A | * | 9/1981 | Gerber | H05B 6/44 219/633 |
| 4,311,896 A | * | 1/1982 | Junya | H05B 6/101 219/642 |
| 5,369,249 A | * | 11/1994 | Kwon | H05B 6/1245 219/624 |

(Continued)

FOREIGN PATENT DOCUMENTS

| | | |
|---|---|---|
| CN | 2901772 Y | 5/2007 |
| CN | 201479410 U | 5/2010 |

(Continued)

OTHER PUBLICATIONS ecee.colorado.edu, Fundamental of Power Electronics, Chapter 14, Inductor design, Dec. 1, 2003 (Year: 2003).*

*Primary Examiner* — Ibrahime A Abraham
*Assistant Examiner* — Gyounghyun Bae
(74) *Attorney, Agent, or Firm* — Dority & Manning, P.A.

(57) ABSTRACT

An induction cooking appliance is provided herein. The induction cooking appliance may include an upper cooking surface, a power source, and a heating assembly in electrical communication with the power source. The power source may be configured to supply a power signal during heating operations. The heating assembly may include a first induction heating coil and a second induction heating coil. The first induction heating coil may be positioned below the upper cooking surface in electrical communication with the (Continued)

power source. The second induction heating coil may be positioned coaxial with the first induction heating coil below the upper cooking surface. The second induction heating coil may be disposed in electrical communication with the power source in non-series communication with the first induction heating coil.

8 Claims, 8 Drawing Sheets

(56) References Cited

U.S. PATENT DOCUMENTS

| | | | | |
|---|---|---|---|---|
| 5,376,774 | A * | 12/1994 | McGaffigan | H05B 6/1245 219/624 |
| 5,450,305 | A * | 9/1995 | Boys | G05F 1/13 219/624 |
| 5,665,263 | A * | 9/1997 | Gaspard | H05B 6/1254 219/622 |
| 8,129,664 | B2 * | 3/2012 | Keishima | H05B 6/1209 219/620 |
| 9,055,615 | B2 * | 6/2015 | Watanabe | H05B 6/062 |
| 2004/0245244 | A1 * | 12/2004 | Hirota | H05B 6/1254 219/624 |
| 2010/0206871 | A1 * | 8/2010 | Kataoka | H05B 6/1209 219/622 |
| 2010/0258556 | A1 * | 10/2010 | Hayashi | H05B 6/065 219/661 |
| 2011/0100980 | A1 * | 5/2011 | Kitaizumi | H05B 6/1245 219/624 |
| 2011/0253706 | A1 | 10/2011 | Wang et al. | |
| 2012/0261405 | A1 * | 10/2012 | Kurose | H05B 6/44 219/620 |
| 2013/0270260 | A1 * | 10/2013 | Shigeoka | H05B 6/1263 219/675 |
| 2014/0042151 | A1 * | 2/2014 | Tonomura | H05B 6/365 219/674 |
| 2018/0199401 | A1 * | 7/2018 | Moon | A47J 27/00 |
| 2018/0242406 | A1 * | 8/2018 | Yun | H05B 6/062 |
| 2018/0359820 | A1 * | 12/2018 | Acero Acero | H05B 6/1272 |
| 2019/0082877 | A1 * | 3/2019 | Dumenil | A47J 43/046 |
| 2020/0008272 | A1 * | 1/2020 | Suga | H05B 6/1272 |
| 2020/0100332 | A1 * | 3/2020 | Inoshita | H05B 6/062 |

FOREIGN PATENT DOCUMENTS

| | | | | |
|---|---|---|---|---|
| EP | | 2170010 B1 | 3/2015 | |
| JP | WO 2018/229967 | | * 12/2018 | |
| WO | WO-2015043650 A1 | * | 4/2015 | H05B 6/065 |

* cited by examiner

INDUCTION COOKING APPLIANCE HAVING MULTIPLE HEATING COILS

FIELD OF THE INVENTION

The present subject matter relates generally to cooking appliances and more particularly to cooking appliances utilizing one or more induction heating assemblies.

BACKGROUND OF THE INVENTION

Induction cooking appliances are generally more efficient, have greater temperature control precision, and provide more uniform cooking than other conventional cooking appliances. In conventional cooktop systems, an electric or gas heat source is used to heat cookware in contact with the heat source. This type of cooking is inefficient because only the portion of the cookware in contact with the heat source is directly heated. The rest of the cookware is heated through conduction that causes non-uniform cooking throughout the cookware. Heating through conduction takes an extended period of time to reach a desired temperature.

In contrast, induction cooking systems use electromagnetism, which turns cookware of the appropriate material into a heat source. When the coil is activated, a magnetic field is produced, which then induces a current on the bottom surface of the cookware. The induced current on the bottom surface induces even smaller currents (Eddy currents) within the cookware, thereby providing heat throughout the cookware.

In some instances, it may be desirable to have an induction cooking system that has a single heating assembly that can accommodate utensils (e.g., cookware) of various different sizes. For instance, certain existing systems include two coaxial regions that are spaced apart from each other by a circular gap along a radial direction. The coaxial regions are formed by a single coil and are thus connected in series. Relatively large utensils will cover or span both coaxial regions (i.e., an inner region and an outer region). Relatively small utensils will only cover or span the inner region. During heating operations, a current will be directed through the coil in series through both coaxial regions. Since heat is generated by inductance, the area in which heat is emitted will generally be limited to the area covered by the cooking utensil.

Nonetheless, certain drawbacks are present in existing systems. As an example, relatively little control is possible for the inner and outer regions. In particular, one region cannot be deactivated without deactivating the other region. Moreover, the current and power, and thereby heat induced, in one region cannot be adjusted independently of the other region. Issues may further arise with interference (e.g., through induced magnetic fields) at one or more of the coaxial regions, detrimentally affecting control and reliability of the assembly.

Therefore, it would be useful to provide an induction cooking appliance addressing one or more of the above-identified issues. In particular, it would be advantageous to provide an induction cooking appliance permitting reliable multi-region control.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, an induction cooking appliance is provided. The induction cooking appliance may include an upper cooking surface, a power source, and a heating assembly in electrical communication with the power source. The power source may be configured to supply a power signal during heating operations. The heating assembly may include a first induction heating coil and a second induction heating coil. The first induction heating coil may be positioned below the upper cooking surface in electrical communication with the power source. The second induction heating coil may be positioned coaxial with the first induction heating coil below the upper cooking surface. The second induction heating coil may be disposed in electrical communication with the power source in non-series communication with the first induction heating coil. The first induction heating coil may define an inductance ratio over the second induction heating coil between about 0.7 and about 1.2.

In another exemplary, aspect of the present disclosure, an induction cooking appliance is provided. The induction cooking appliance may include an upper cooking surface, a power source, and a heating assembly in electrical communication with the power source. The power source may be configured to supply a power signal during heating operations. The heating assembly may include a first inducting heating coil, a second induction heating coil, a first set of circumferentially-saced ferrite cores, and a second set of circumferentially-spaced ferrite cores. The first induction heating coil may be positioned below the upper cooking surface in electrical communication with the power source. The second induction heating coil may be positioned coaxial with the first induction heating coil below the upper cooking surface. The second induction heating coil may be disposed in electrical communication with the power source in electrical parallel communication with the first induction heating coil. The first induction heating coil may define an inductance ratio over the second induction heating coil between about 0.7 and about 1.2. The first set of circumferentially-spaced ferrite cores may be positioned below the first induction heating coil. The second set of circumferentially-spaced ferrite cores may be positioned below the second induction heating coil. The first set of circumferentially-spaced ferrite cores may be radially offset from the second set of circumferentially-spaced ferrite cores at a predetermined angle about a central coil axis.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In order to aid understanding of this disclosure, several terms are defined below. The defined terms are understood to have meanings commonly recognized by persons of ordinary skill in the arts relevant to the present invention. The terms "includes" and "including" are intended to be inclusive in a manner similar to the term "comprising." Similarly, the term "or" is generally intended to be inclusive (i.e., "A or B" is intended to mean "A or B or both"). The terms "first," "second," and "third" may be used interchangeably to distinguish one component from another and are not intended to signify location or importance of the individual components. Furthermore, as used herein, terms of approximation, such as "approximately," "substantially," or "about," refer to being within a ten percent margin of error.

Figure 1:
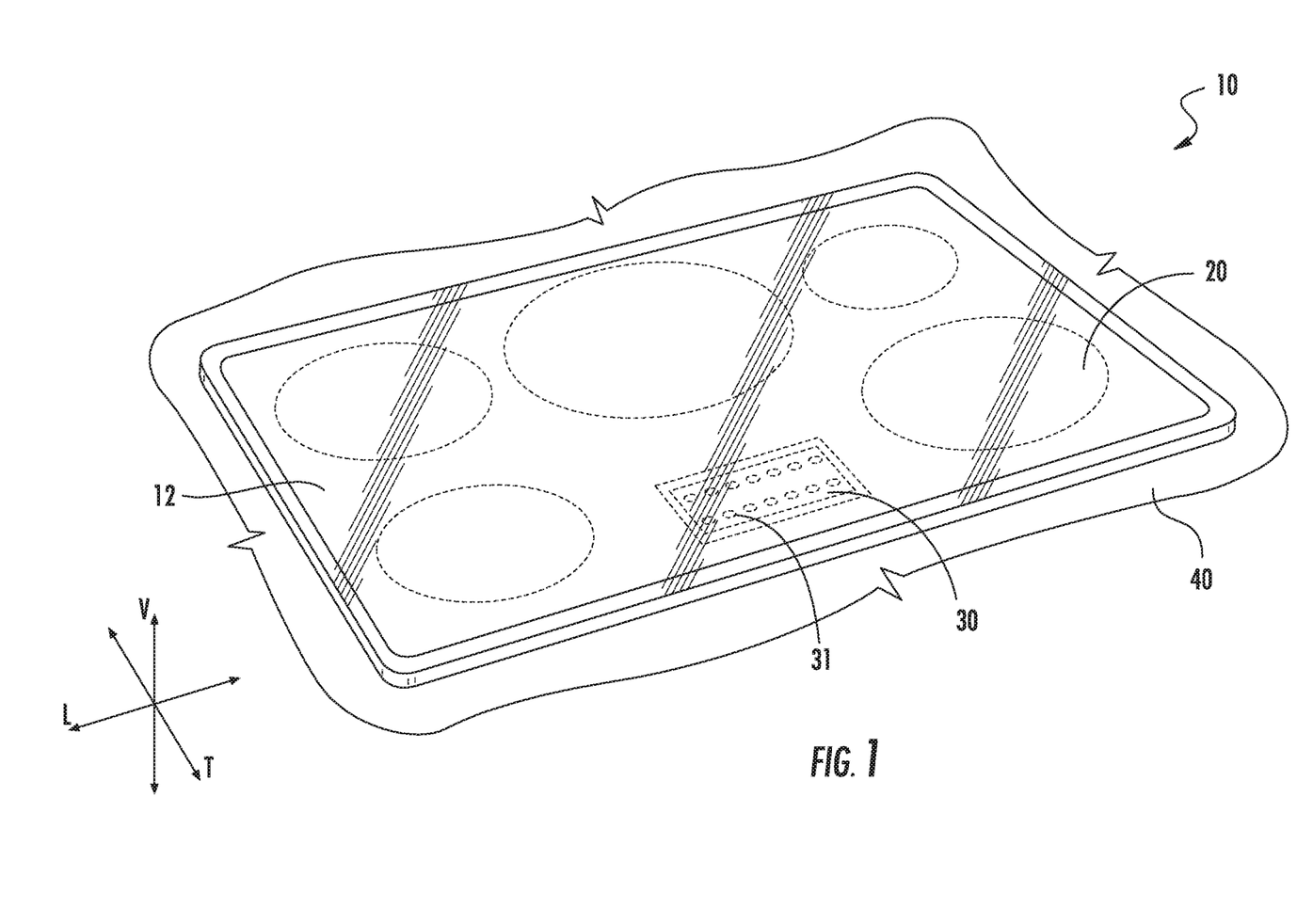
FIG. 1 provides a top perspective view of an induction cooking appliance according to exemplary embodiments of the present disclosure.

Turning now to the figures, FIG. 1 depicts an induction cooking appliance 10 according to exemplary embodiments of the present disclosure. Cooking appliance 10 can be installed in chassis 40 and in various configurations such as cabinetry in a kitchen, coupled with one or more ovens or as a stand-alone appliance. Chassis 40 can be grounded. Cooking appliance 10 includes a horizontal upper surface 12 (e.g., upper cooking or cooktop surface) that can be glass or other suitable material. Horizontal upper surface 12 may generally extend within a plane defined by the lateral and transverse axes L, T. Items for cooking, such as pots and pans, may be placed on an upper surface 12 of the cooking appliance 10 for heating. One or more heating assemblies 20 (e.g., induction heating assemblies) can be provided below horizontal surface 12 (e.g., along the vertical direction V). It is understood that one or more of the heating assemblies 20 can include a single induction coil or a plurality of induction coils.

Cooking appliance 10 is provided by way of example only. The present disclosure can be used with other configurations. For example, a cooktop having one or more induction coils in combination with one or more electric or gas burner assemblies. In addition, the present disclosure can be used with a cooktop having a different number or positions of heating assemblies. The present disclosure can also be used with induction cooktops installed on ranges. Moreover, the present disclosure can be used with standalone induction cooking appliances or devices.

A user interface 30 can have various configurations and controls can be mounted in other configurations and locations other than as shown in the exemplary embodiments of FIG. 1. In the illustrated embodiment, the user interface 30 is located within a portion of the horizontal surface 30, as shown. Alternatively, the user interface can be positioned on a vertical surface near a front side of the cooking appliance 10 or other suitable location. The user interface 30 can include, for instance, a capacitive touch screen input device component 31. The input component 31 can allow for the selective activation, adjustment or control of any or all induction coils 20 as well as any timer features or other user adjustable inputs. One or more of a variety of electrical, mechanical or electro-mechanical input device including rotary dials, push buttons, and touch pads can also be used singularly or in combination with the capacitive touch screen input device component 31. The user interface 30 can include a display component, such as a digital or analog display device designed to provide operation feedback to a user.

Figure 2:
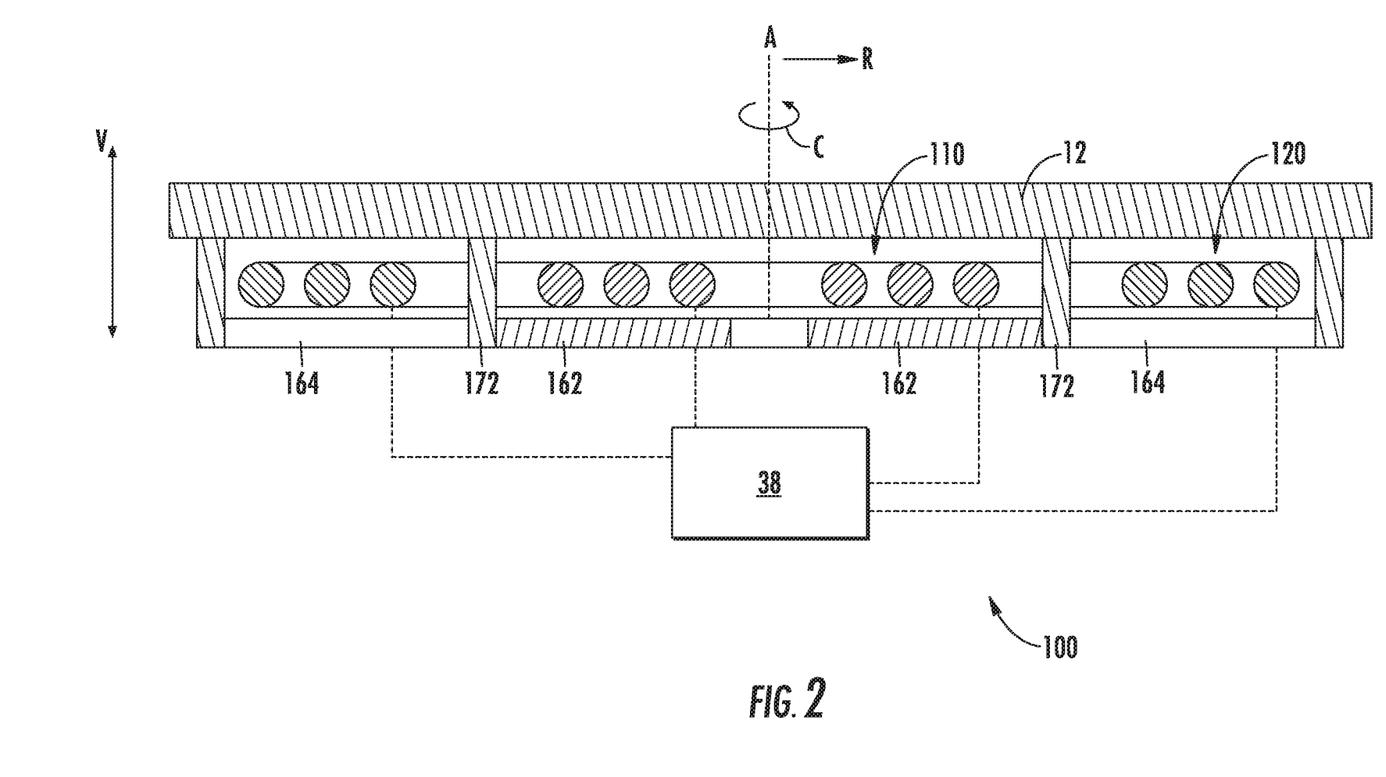
FIG. 2 provides a schematic cross-sectional view of a heating assembly according to exemplary embodiments of the present disclosure.
Figure 3:
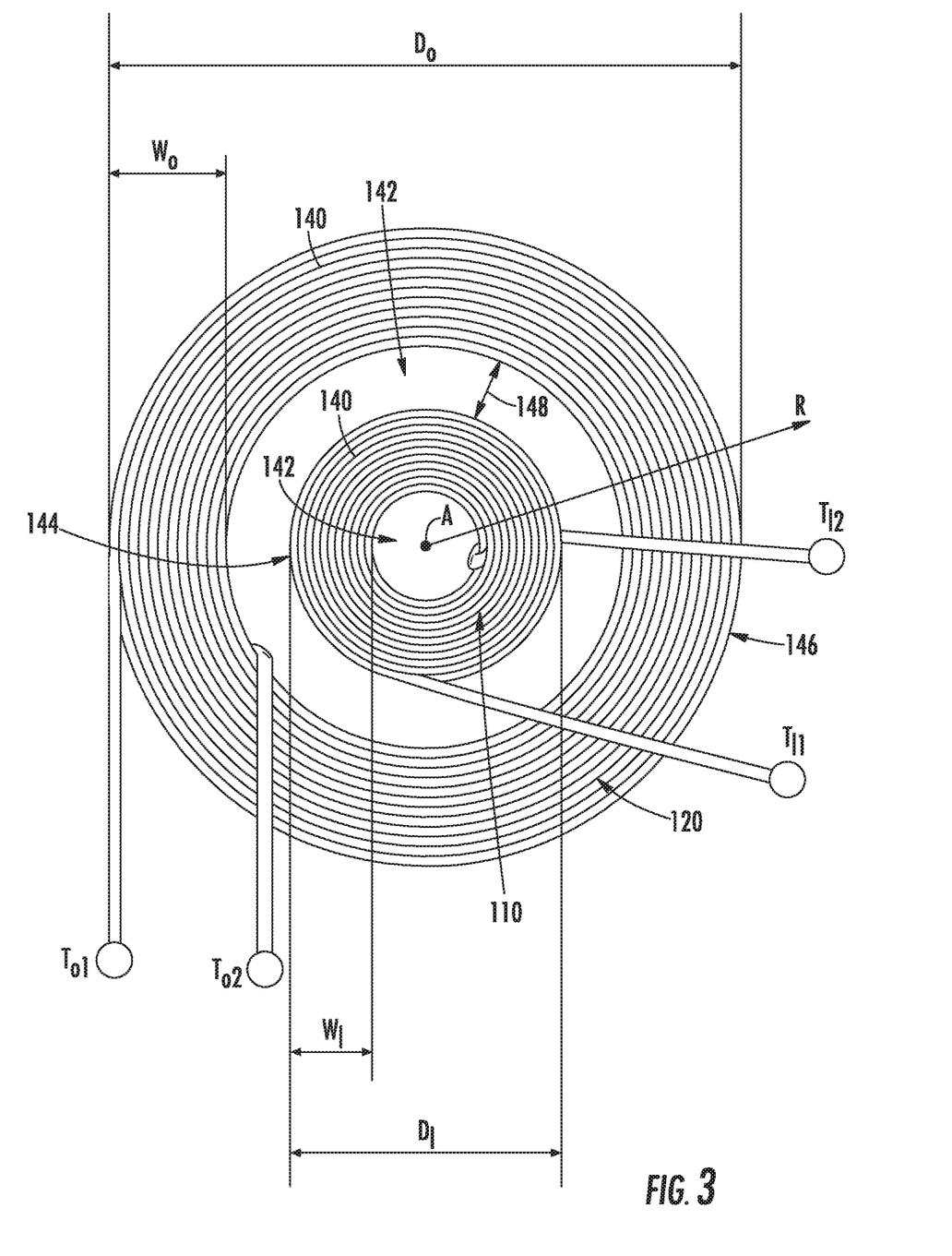
FIG. 3 provides a perspective view of a portion of a heating assembly according to exemplary embodiments of the present disclosure.
Figure 4:
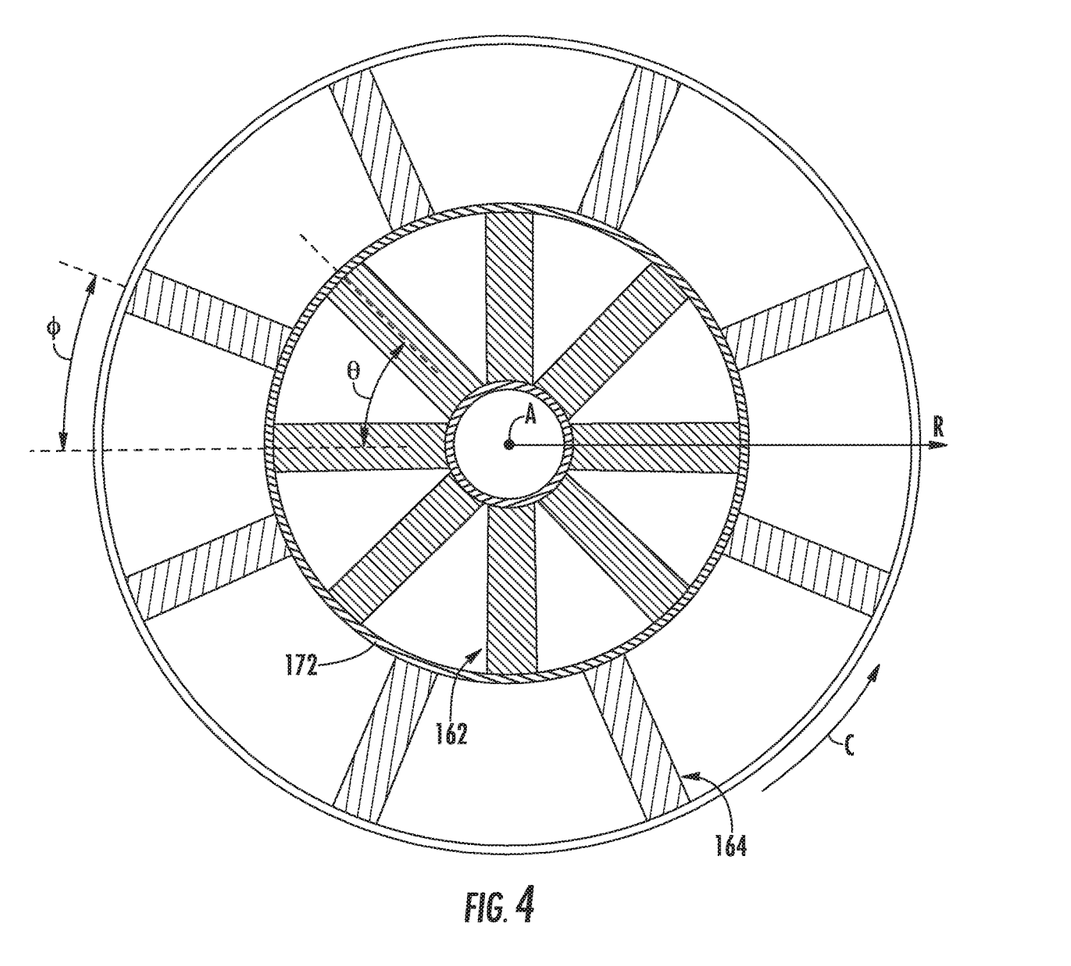
FIG. 4 provides a perspective view of another portion of a heating assembly according to exemplary embodiments of the present disclosure.

FIGS. 2 through 5 provide illustrate a heating assembly 100 of cooking appliance 10 (FIG. 1) according to exemplary embodiments of the present disclosure. In particular, FIG. 2 provides a schematic cross-sectional view of heating assembly 100. FIGS. 3 and 4 provide views of different portions of heating assembly 100. It is understood that heating assembly 100 may be provided within any suitable cooking appliance and may, for instance, be embodied as a heating assembly 20, or in addition thereto.

As shown, especially at FIGS. 2 and 3, heating assembly 100 includes multiple heating coils (e.g., induction heating coils 110, 120) positioned below upper surface 12. In some embodiments, a first induction heating coil 110 and a second induction heating coil 120 of the same heating assembly 100 are positioned below upper surface 12. The first and second induction heating coils 110, 120 may be coaxial with each other and, for example, curved about a common central axis A (i.e., central coil axis). When assembled, second induction heating coil 120 may be positioned radially outward from first induction heating coil 110. In other words, first induction heating coil 110 is positioned proximal to the central axis A (e.g., along a radial direction R extending orthogonally from the central axis A) while second induction heating coil 120 is positioned distal to the central axis A.

First and second induction heating coils 110, 120 are provided as separate or discrete members. When assembled, first and second induction heating coils 110, 120 may be spaced apart from each other (e.g., along the radial direction R). Moreover, the first and second induction heating coils 110, 120 may be in a non-contacting relative position such that neither induction heating coil 110 or 120 directly contacts the other. Moreover, each induction heating coil 110 and 120 may be formed from a suitable wire gauge that has a composition or cross-sectional diameter (e.g., thickness) that is different from or, alternatively, the same as the wire gauge that forms the other induction heating coil 120 or 130.

In some embodiments, one or more of the induction heating coils 110, 120 are formed as a spiraled ring. For instance, either or both of first induction heating coil 110 and second induction heating coil 120 may include an induction body 140, formed about an interior aperture 142. The induction body 140 may have a generally circular footprint or perimeter 144 (e.g., when viewed from above or perpendicular to the central axis A). Thus, the induction body 140 may be provided or shaped as a substantially toroidal polyhedron, as shown.

In certain embodiments, the first induction heating coil 110 and the second induction heating coil 120 each have a concentric induction body 140 positioned about the central axis A. First induction heating coil 110 defines an overall diameter $D_I$ that spans a perimeter 144 of first induction heating coil 110 (e.g., across the corresponding induction body 140 and interior aperture 142). A body width $W_I$ is defined (e.g., along the radial direction R) between the interior aperture 142 and the perimeter 144 of first induction heating coil 110.

Second induction heating coil 120 defines an overall diameter $D_O$ that spans a perimeter 146 of second induction heating coil 120 (e.g., across the corresponding induction body 140 and interior aperture 142). A body width $W_O$ is defined (e.g., along the radial direction R) between the interior aperture 142 and the perimeter 146 of second induction heating coil 120. The diameter $D_O$ is generally larger than the diameter $D_I$. The body width $W_O$ may be larger than, less than, or equal to the body width $W_I$.

As shown, first induction heating coil 110 may be positioned within the interior aperture 142 of second induction heating coil 120. Thus, a radial gap 148 may be defined between the perimeter 146 of first induction heating coil 110 and an interior portion of second induction heating coil 120 (e.g., a radial extreme of interior aperture 142 of second induction heating coil 120). Optionally, each induction heating coil 110 and 120 may be positioned or rest in a common radial plane. For instance, first and second induction heating coils 110, 120 may be parallel to each other on a plane (e.g., horizontal plane) perpendicular to the central axis A or vertical direction V.

Each induction heating coil 110 and 120 includes a separate pair of terminals through which a current is directed. In particular, first induction heating coil 110 includes a first terminal $T_{I1}$ and a second terminal $T_{I2}$ between which the induction body 140 of first induction heating coil 110 is disposed (e.g., relative to the direction of an electric current therethrough). Second induction heating coil 120 includes a first terminal $T_{O1}$ and a second terminal $T_{O2}$ between which induction body 140 of second induction heating coil 120 is disposed (e.g., relative to the direction of an electric current therethrough). As will be described in further detail below, each pair of terminals $T_{I1}$, $T_{I2}$ and $T_{O1}$, $T_{O2}$ may be separately connected (e.g., in electrical communication) with a controller 38, which includes or is otherwise in electrical communication with a power source (e.g., AC power source). For instance, the terminal pair $T_{I1}$, $T_{I2}$ of first induction heating coil 110 may be connected with controller 38 separately from the terminal pair $T_{O1}$, $T_{O2}$ of second induction heating coil 120, which is also connected with controller 38.

Turning especially to FIGS. 2 and 4, in some embodiments, one or more ferrite cores are positioned below the induction heating coils 110, 120. During heating operations (e.g., when induction heating coils 110, 120 are actively generating an induced magnetic field), the ferrite cores may generally block electromagnetic flow therethrough, thus directing the induced magnetic field(s) vertically upward. As an example, a first set of ferrite cores 162 may be positioned below first induction heating coil 110 (e.g., directly beneath the induction body 140 of first induction heating coil 110). As an additional or alternative example, a second set of ferrite cores 164 may be positioned below second induction heating coil 120 (e.g., directly beneath the induction body 140 of second induction heating coil 120).

In certain embodiments, each core of the first set of ferrite cores 162 may span, for instance the body width $W_I$ of the induction body 140 of first induction heating coil 110. Additionally or alternatively, each core of the first set of ferrite cores 162 may be circumferentially spaced from the other. Adjacent ferrite cores may be spaced apart from each other by a set distance along a circumferential direction C defined about the central axis A (i.e., at a set angle θ about the central axis A). In some embodiments, the circumferential distance or angle between each pair of adjacent ferrite cores for the first set of ferrite cores 162 is identical. Thus, the first set of ferrite cores 162 may be equally spaced along the circumferential direction C.

Although the first set of ferrite cores 162 is illustrated as having eight total ferrite cores, any suitable number of ferrite cores may be provided. For instance, the first set of ferrite cores 162 have an even number of total ferrite cores.

In further embodiments, each core of the second set of ferrite cores 164 may span, for instance the body width $W_O$ of the induction body 140 of second induction heating coil 120. Additionally or alternatively, each core of the second set of ferrite cores 164 may be circumferentially spaced from the other. Adjacent ferrite cores may be spaced apart from each other by a set distance along a circumferential direction C defined about the central axis A (i.e., at a set radial angle θ about the central axis A). In some embodiments, the circumferential distance or radial angle between each pair of adjacent ferrite cores for the second set of ferrite cores 164 is identical. Thus, the second set of ferrite cores 164 may be equally spaced along the circumferential direction C.

Although the second set of ferrite cores 164 is illustrated as having eight total ferrite cores, any suitable number of ferrite cores may be provided. For instance, the second set of ferrite cores 164 has an even number of total ferrite cores. Optionally, the second set of ferrite cores 164 have the same shape or total number of ferrite cores as the first set of ferrite cores 162. Additionally or alternatively, the second set of ferrite cores 164 may be radially offset from the first set of ferrite cores 162, as illustrated in FIG. 4. In particular, the two sets of ferrite cores 162, 164 may be radially offset at a predetermined angle φ about the central axis A. For example, the predetermined angle φ may be an angle equal to about half of the set angle θ. Notably, the predetermined angle of offset φ may limit interference between the induction heating coils 110, 120 (e.g., during heating operations when an electric current is supplied to each induction heating coil 110 and 120).

In optional embodiments, a shielding band 172 may be positioned between the first induction heating coil 110 and the second induction heating coil 120 (e.g., along a radial direction R). For instance, shielding band 172 may be formed as a solid ring or toroidal polyhedron about the central axis A and first induction heating coil 110. When assembled, shielding band 172 may be concentric with first induction heating coil 110 or second induction heating coil 120. Additionally or alternatively, shielding band 172 may extend from a position above (e.g., higher than) the induction heating coils 110, 120 to a position below (e.g., lower than) the induction heating coils 110, 120. Generally, shielding band may be formed from any suitable material to prevent or restrict magnetic field interference between first induction heating coil 110 and second induction heating coil 120.

Figure 5:
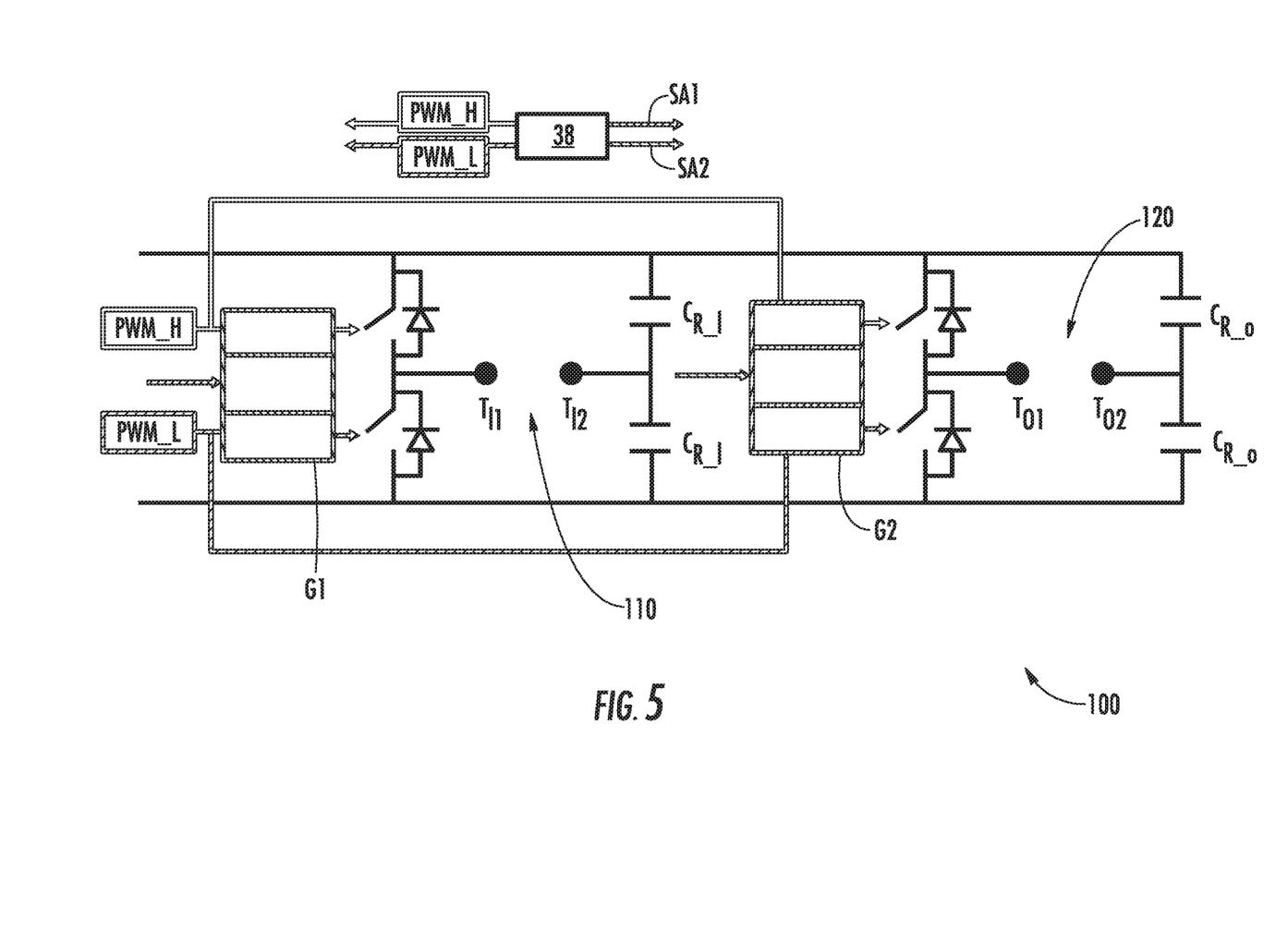
FIG. 5 provides a schematic view of a circuit diagram for a heating assembly according to exemplary embodiment of the present disclosure.

Turning especially to FIGS. 2 and 5, first induction heating coil 110 and second induction heating coil 120 may each be in electrical communication with controller 38, including a power source (e.g., AC power source), as noted above.

Generally, controller 38 may be configured to control one or more heating operations of cooking appliance 10. For example, controller 38 may control at least one operation of cooking appliance 10 that involves heating assembly 100. Controller 38 may be in communication (via for example a suitable wired or wireless connection) with first induction heating coil 110 and second induction heating coil 120.

By way of example, controller 38 may include one or more memory devices (e.g., non-transitive memory) and one or more microprocessors, such as general or special purpose microprocessors operable to execute programming instructions or micro-control code associated with an operating cycle. The memory devices or memory may represent random access memory such as DRAM, or read only memory such as ROM or FLASH. In one embodiment, the processor executes programming instructions stored in memory. The memory may be a separate component from the processor or may be included onboard within the processor.

Controller 38 may be positioned in a variety of locations throughout cooking appliance 10. As illustrated, controller 38 may be located within cooking appliance 10, e.g., behind or beneath upper surface 12. In some such embodiments, input/output ("I/O") signals may be routed between controller 38 and various operational components of cooking appliance 10, such as heating element(s) 20, user interface 30, display components, sensors, alarms, or other components as may be provided. For instance, signals may be directed along one or more wiring harnesses that may be routed through cooking appliance 10. In some embodiments, controller 38 is in communication with user interface 30 and corresponding inputs (e.g., capacitive screen 31) through which a user may select various operational features and modes and monitor progress of cooking appliance 10.

In some embodiments, controller 38 is configured to selectively direct one or more electric currents to induction heating coils 110, 120. For instance, controller 38 may selectively direct an electric current via a high output pulse-width modulation signal (PWM_H) or a low output pulse-width modulation signal (PWM_L) to one or both of induction heating coils 110, 120. Separate gate signals SA1 and SA2 may further be selectively and independently directed to a first gate driver G1 and a second gate driver G2. When activated (e.g., when an activation signal SA1 or SA2 is received at the gate driver G1 or G2), a gate driver G1 or G2 may permit the electric current to the corresponding induction heating coil 110 or 120. When deactivated (e.g., when no activation signal SA1 or SA2 is received at the gate driver G1 or G2), the gate driver G1 or G2 may remain open, restricting the electric current to the corresponding induction heating coil 110 or 120, irrespective of PWM_H and PWM_L. Resonant capacitances, $C_{R\_I}$ and $C_{R\_O}$, may be equal to or different from each other.

As shown in FIG. 5, second induction heating coil 120 is generally disposed in electrical communication with controller 38 in non-series communication with the first induction heating coil 110. In certain embodiments, second induction heating coil 120 is disposed in electrical parallel communication with the first induction heating coil 110. When assembled, the first induction heating coil 110 defines an inductance ratio over the second induction heating coil 120 between about 0.7 and about 1.2. For instance, the second induction heating coil 120 may have an inductance of about seventy millihenries (mH). Additionally or alternatively, the first induction heating coil 110 may have an inductance of about fifty mH. Advantageously, the inductance ratio between the induction heating coils 110, 120 may passively control the respective current phases through the induction heating coils 110, 120, thereby limiting magnetic field interference without additional or complex active control schemes/mechanisms.

Although FIGS. 2 through 5 illustrate exemplary embodiments of heating assembly 100 having only two induction heating coils, it is understood that other exemplary embodiments may include a greater number of induction heating coils (e.g., three or more). As an example, FIGS. 6 through 8 generally illustrate an exemplary embodiment of heating assembly 100 having at least three heating coils (e.g., induction heating coils 110, 120, 130). However, it is noted that further exemplary embodiments may include more than three induction heating coils in light of the present disclosure.

Figure 6:
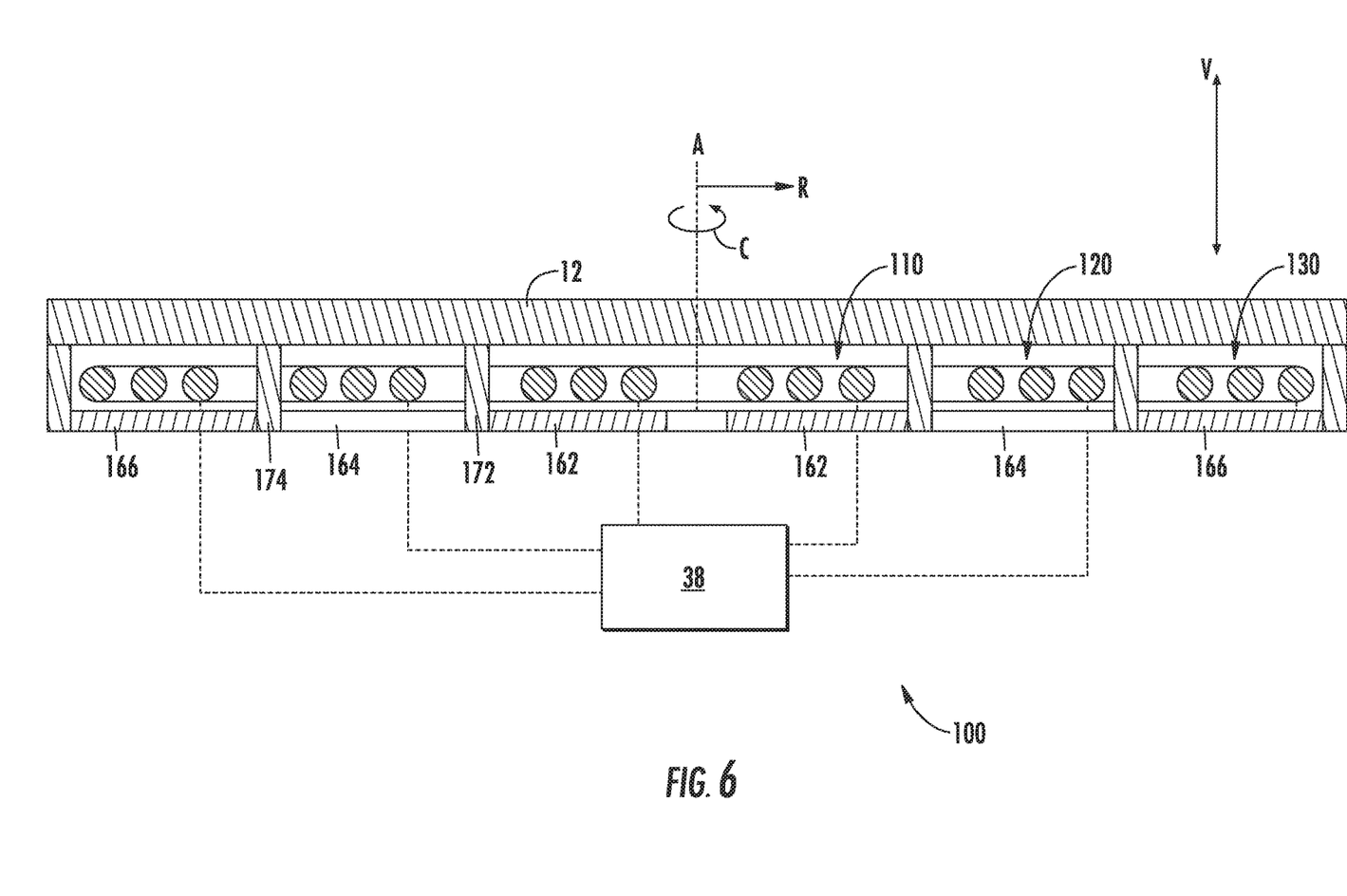
FIG. 6 provides a schematic view of a heating assembly according to exemplary embodiments of the present disclosure.
Figure 7:
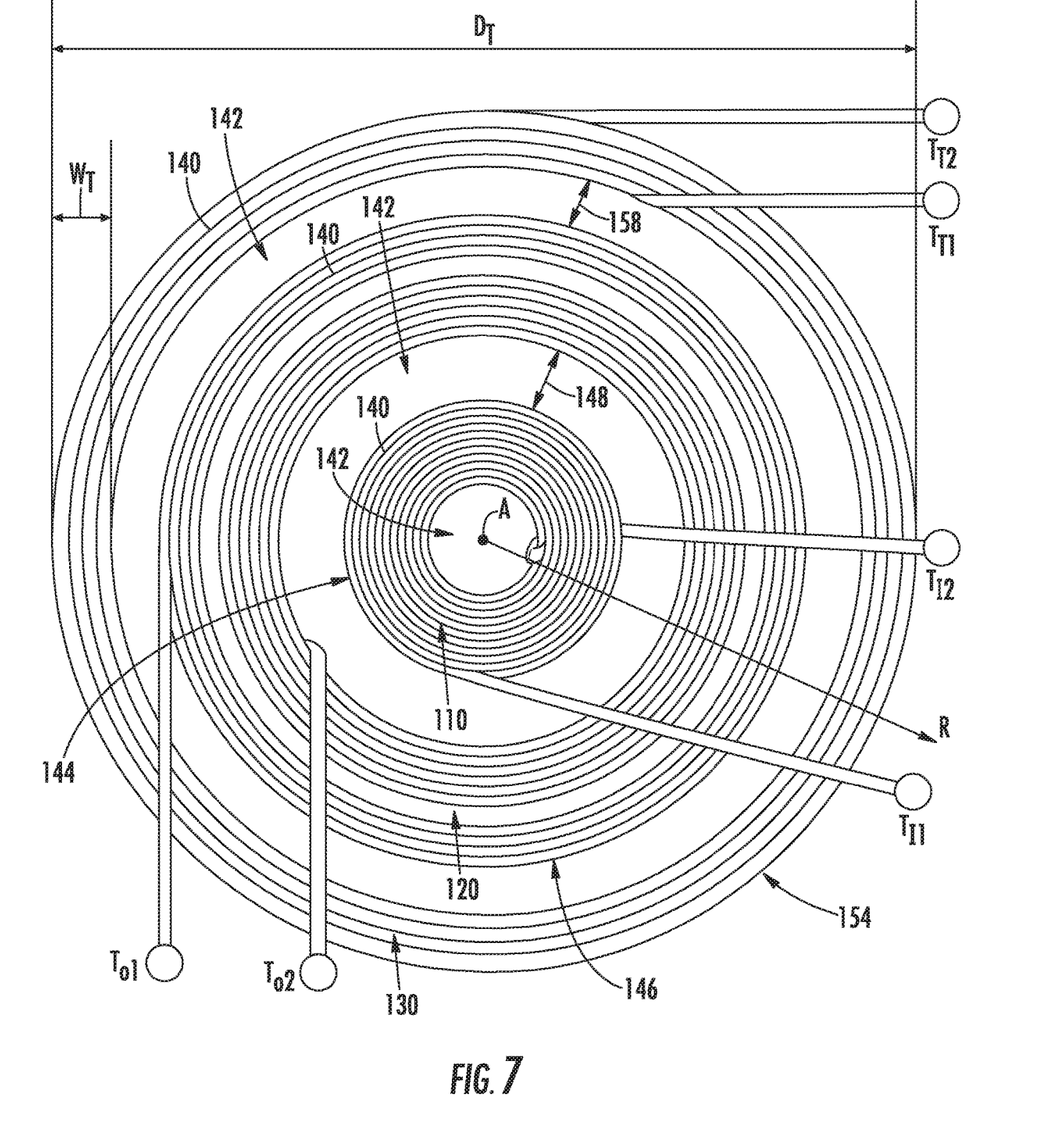
FIG. 7 provides a perspective view of a portion of a heating assembly according to exemplary embodiments of the present disclosure.
Figure 8:
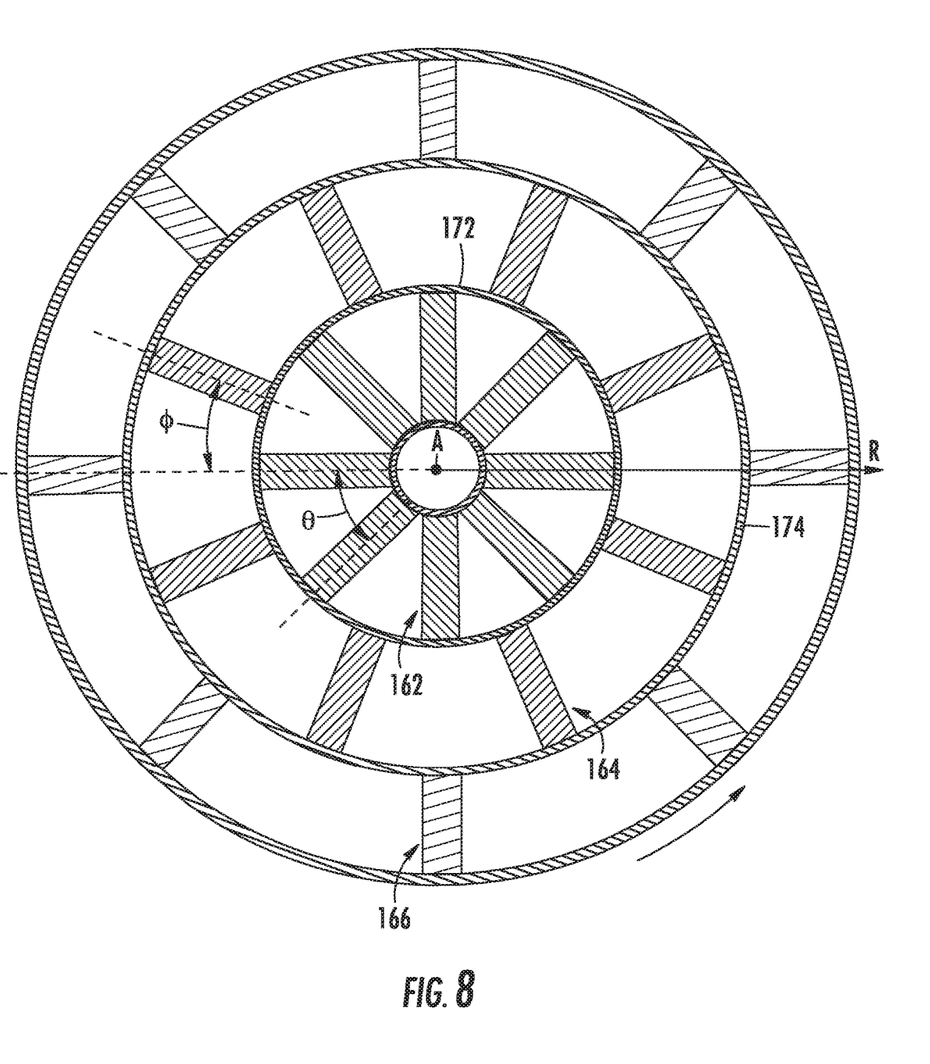
FIG. 8 provides a perspective view of another portion of a heating assembly according to exemplary embodiments of the present disclosure.

With respect to the exemplary embodiment of FIGS. 6 through 8, the first and second induction heating coils 110, 120 may be provided as described above with respect to FIGS. 2 through 5. Similar to the first and second induction heating coils 110, 120, the third induction heating coil 130 may be positioned below upper surface 12. Moreover, the third induction heating coil 130 may be, for instance, disposed in electrical communication with the controller 38 and power source (e.g., in non-series or parallel electrical communication with the first and second induction heating coils 110, 120).

As illustrated, third induction heating coil 130 may be positioned below upper surface 12 (e.g., coaxial with first and second induction heating coils 110, 120 and, for example, curved about central axis A). When assembled, third induction heating coil 130 may be positioned radially outward from second induction heating coil 120.

Third induction heating coil 130 is provided as a separate or discrete member from first and second induction heating coils 110, 120. When assembled, third induction heating coil 130 may be spaced apart from each second induction heating coil 120 (e.g., along the radial direction R). Moreover, third induction heating coil 130 may be in a non-contacting relative position to first and second induction heating coils 110, 120 such that none of the induction heating coils 110, 120, 130 directly contacts the other.

In some embodiments, third induction heating coil 130 is formed as a spiraled ring. Third induction heating coil 130 may include an induction body 140 formed about an interior aperture 142. The induction body 140 of third induction heating coil 130 may have a generally circular footprint or perimeter 154 (e.g., when viewed from above or perpendicular to the central axis A). Thus, the induction body 140 may be provided or shaped as a substantially toroidal polyhedron, as shown. Moreover, induction body 140 of third induction heating coil 130 may be concentric with the induction bodies of first and second induction heating coils 110, 120.

Third induction heating coil 130 defines an overall diameter $D_T$ that spans a perimeter 154 of third induction heating coil 130 (e.g., across the corresponding induction body 140 and interior aperture 142 of third induction heating coil 130). A body width $W_T$ is defined (e.g., along the radial direction R) between the interior aperture 142 of third heating coil 130 and the perimeter 146 of second induction heating coil 120. The diameter $D_T$ is generally larger than the diameter $D_O$. The body width $W_T$ may be larger than, less than, or equal to the body width $W_O$.

As shown, second induction heating coil 120 may be positioned within the interior aperture 142 of third induction heating coil 130. Thus, a radial gap 158 may be defined between the perimeter 146 of second induction heating coil 120 and an interior portion of third induction heating coil 130 (e.g., a radial extreme of interior aperture 142 of third induction heating coil 130). Optionally, each induction heating coil 110, 120, and 130 may be positioned or rest in a common radial plane. For instance, third induction heating coil 130 may be parallel to first and second induction heating coils 110, 120 on a plane (e.g., horizontal plane) perpendicular to the central axis A or vertical direction V.

Third induction heating coil 130 includes a separate pair of terminals through which a current is directed. In particular, third induction heating coil 130 includes a first terminal $T_{T1}$ and a second terminal $T_{T2}$ between which induction body 140 is disposed (e.g., relative to the direction of an electric current therethrough). The pair of terminals $T_{T1}$, $T_{T2}$ is connected (e.g., in electrical communication) with controller 38 separately from the terminal pairs $T_{I1}$, $T_{I2}$ and $T_{O1}$, $T_{O2}$ of first and second induction heating coils 110, 120.

Turning especially to FIGS. 6 and 8, in some embodiments, a third set of ferrite cores 166 may be positioned below third induction heating coil 130 (e.g., directly beneath the induction body 140 of third induction heating coil 130). Each core of the third set of ferrite cores 166 may span, for instance the body width $W_O$ of the induction body 140 of third induction heating coil 130. Additionally or alternatively, each core of the third set of ferrite cores 166 may be circumferentially-spaced from the other. Adjacent ferrite cores may be spaced apart from each other by a set distance along a circumferential direction C defined about the central axis A (i.e., at a set radial angle θ about the central axis A). In some embodiments, the circumferential distance or radial angle between each pair of adjacent ferrite cores for the third set of ferrite cores 166 is identical. Thus the third set of ferrite cores 166 may be equally spaced along the circumferential direction C.

Although the third set of ferrite cores 166 is illustrated as having eight total ferrite cores, any suitable number of ferrite cores may be provided. For instance, the third set of ferrite cores 166 has an even number of total ferrite cores. Optionally, the third set of ferrite cores 166 have the same total number of ferrite cores as the first set of ferrite cores 162 or the second set of ferrite cores 164. Additionally or alternatively, the third set of ferrite cores 166 may be radially aligned with the first set of ferrite cores 162, as illustrated in FIG. 8. In particular, each core of the third set of ferrite cores 166 may be parallel with a corresponding core of the first set of ferrite cores 162 (e.g., along a radial direction R). In turn, the third set of ferrite cores 166 may be radially offset from the second set of ferrite cores 164.

In optional embodiments, a shielding band 174 may be positioned between the second induction heating coil 120 and the third induction heating coil 130 (e.g., along a radial direction R). For instance, shielding band 174 may be formed as a solid ring or toroidal polyhedron about the central axis A and second induction heating coil 120. When assembled, shielding band 174 may be concentric with first induction heating coil 110 or second induction heating coil 120. Additionally or alternatively, shielding band 174 may extend from a position above (e.g., higher than) the induction heating coils 110, 120, 130 to a position below (e.g., lower than) the induction heating coils 110, 120, 130.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:
1. An induction cooking appliance comprising:
an upper cooking surface;
a power source configured to supply a power signal during heating operations; and
a heating assembly in electrical communication with the power source to receive the power signal, the heating assembly comprising
a first induction heating coil positioned below the upper cooking surface in electrical communication with the power source, the first induction heating coil having an inductance of about fifty millihenries (mH),
a second induction heating coil positioned coaxial with the first induction heating coil below the upper cooking surface, the second induction heating coil being disposed in electrical communication with the power source in non-series communication with the first induction heating coil, the second induction heating coil having an inductance of about seventy mH,
a third induction heating coil positioned coaxial with the second induction heating coil below the upper cooking surface, the third induction heating coil being disposed in electrical communication with the power source in non-series communication with the first induction heating coil,
a first set of circumferentially-spaced ferrite cores positioned below the first induction heating coil,
a second set of circumferentially-spaced ferrite cores positioned below the second induction heating coil, and
a third set of circumferentially-spaced ferrite cores positioned below the third induction heating coil,
wherein the first set of circumferentially-spaced ferrite cores is radially aligned with the third set of circumferentially-spaced ferrite cores and radially spaced apart from the third set of circumferentially-spaced ferrite cores.

2. The induction cooking appliance of claim 1, wherein the first set of circumferentially-spaced ferrite cores has an even number of total ferrite cores equally spaced along a circumferential direction about the central coil axis, wherein the second set of circumferentially-spaced ferrite cores has an even number of total ferrite cores equally spaced along the circumferential direction about the central coil axis, and wherein the third set of circumferentially-spaced ferrite cores has an identical number of total ferrite cores as the first set of circumferentially-spaced ferrite cores.

3. The induction cooking appliance of claim 1, wherein the first induction heating coil defines an inductance ratio over the second induction heating coil between about 0.7 and about 1.2.

4. The induction cooking appliance of claim 1, wherein the first set of circumferentially-spaced ferrite cores is radially offset from the second set of circumferentially-spaced ferrite cores at a predetermined angle about a central coil axis.

5. The induction cooking appliance of claim 1, wherein the heating assembly further comprises an electromagnetic shielding band positioned between the first induction heating coil and the second induction heating coil along a radial direction from the central coil axis.

6. An induction cooking appliance comprising:
an upper cooking surface;
a power source configured to supply a power signal during heating operations; and
a heating assembly in electrical communication with the power source to receive the power signal, the heating assembly comprising
    a first induction heating coil positioned below the upper cooking surface in electrical communication with the power source, the first induction heating coil having an inductance of about fifty millihenries (mH),
    a second induction heating coil positioned coaxial with the first induction heating coil below the upper cooking surface, the second induction heating coil being disposed in electrical communication with the power source in non-series communication with the first induction heating coil, the second induction heating coil having an inductance of about seventy mH,
    a third induction heating coil positioned coaxial with the second induction heating coil below the upper cooking surface, the third induction heating coil being disposed in electrical communication with the power source in non-series communication with the first induction heating coil,
    a first set of circumferentially-spaced ferrite cores positioned below the first induction heating coil,
    a second set of circumferentially-spaced ferrite cores positioned below the second induction heating coil, and
    a third set of circumferentially-spaced ferrite cores positioned below the third induction heating coil,
wherein the first set of circumferentially-spaced ferrite cores is radially aligned with the third set of circumferentially-spaced ferrite cores,
wherein the first set of circumferentially-spaced ferrite cores is radially spaced apart from both the second set of circumferentially-spaced ferrite cores and the third set of circumferentially-spaced ferrite cores,
wherein the first set of circumferentially-spaced ferrite cores is radially offset from the second set of circumferentially-spaced ferrite cores at a predetermined angle about a central coil axis, and
wherein the first induction heating coil defines an inductance ratio over the second induction heating coil between about 0.7 and about 1.2.

7. The induction cooking appliance of claim 6, wherein the first set of circumferentially-spaced ferrite cores has an even number of total ferrite cores equally spaced along a circumferential direction about the central coil axis, wherein the second set of circumferentially-spaced ferrite cores has an even number of total ferrite cores equally spaced along the circumferential direction about the central coil axis, and wherein the third set of circumferentially-spaced ferrite cores has an identical number of total ferrite cores as the first set of circumferentially-spaced ferrite cores.

8. The induction cooking appliance of claim 6, wherein the heating assembly further comprises an electromagnetic shielding band positioned between the first induction heating coil and the second induction heating coil along a radial direction from the central coil axis.

* * * * *